United States Patent Office 2,862,968
Patented Dec. 2, 1958

---

2,862,968

METHADONE N-OXIDE AND THE ACID ADDITION SALTS THEREOF

Burris D. Tiffany, Kalamazoo, Mich., assignor to The Upjohn Company, Kalamazoo, Mich., a corporation of Michigan No Drawing. Application August 16, 1955
Serial No. 528,801

4 Claims. (260—570)

This invention relates to new organic compounds and is particularly directed to 6-dimethylamino-4,4-diphenyl-3-heptanone N-oxide either as the free base or as an acid addition salt thereof.

It is an object of the invention to provide novel physiologically active compounds. It is a further object to provide novel analgesics and narcotics. It is a further object to provide novel compounds which are safe and effective for these purposes and have a higher therapeutic index than the corresponding tertiary amine.

These and other objects are accomplished in the novel compounds of the invention which are represented by the following basic formula:

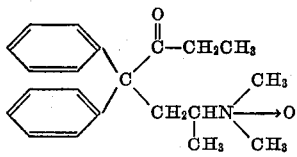

and can exist and can be used for the purposes of the invention in the form of the free base or an acid addition salt thereof with a pharmacologically acceptable acid such as hydrochloric, hydrobromic, hydriodic, sulfuric, phosphoric, nitric, acetic, benzoic, salicylic, glycolic, succinic, nicotinic, tartaric, maleic, malic, lactic acids, and the like.

The invention may be more fully understood by the following examples which are illustrative only and not to be construed as limiting.

EXAMPLE 1

*6-dimethylamino-4,4-diphenyl-3-heptanone N-oxide free base*

In a 500-milliliter Erlenmeyer flask a solution of 30.9 grams (0.10 mole) of *dl*-6-dimethylamino-4,4-diphenyl-3-heptanone (free base) in 300 milliliters of anhydrous methanol was treated with fifteen milliliters (0.16 mole) of thirty percent aqueous hydrogen peroxide and allowed to stand three days at room temperature. Addition of 0.05 gram of platinum oxide caused fairly vigorous gas evolution for about thirty minutes at which time no peroxide could be detected with potassium iodide-starch solution. The platinum catalyst was removed by filtration and the filtrate concentrated to a viscous yellow syrup which was dissolved in thirty milliliters of ethyl acetate. Cooling caused separation of fine white crystals which were collected, washed with ether, and dried, giving 10.2 grams (31 percent) of 6-dimethylamino-4,4-diphenyl-3-heptanone N-oxide free base, melting point 68–68.5 degrees centigrade, sintering at 65.5 degrees centigrade. Recrystallization twice from ethyl acetate gave an analytical sample, melting point 68–70 degrees centigrade, sintering at 64 degrees centigrade.

*Analysis.*—Calcd. for $C_{21}H_{27}NO_2$: C, 77.50; H, 8.36. Found: C, 77.06; H, 8.50.

EXAMPLE 2

*6-dimethylamino-4,4-diphenyl-3-heptanone N-oxide hydrochloride*

Dry hydrogen chloride was passed into an ether solution of 6-dimethylamino-4,4-diphenyl-3-heptanone N-oxide free base. 6-dimethylamino-4,4-diphenyl-3-heptanone N-oxide hydrochloride precipitated as an oil, which was recovered by decantation.

In place of hydrochloric acid there may be substituted appropriate acids to obtain the hydrobromide, the hydroiodide, the sulfate, the phosphate, the nitrate, the acetate, the benzoate, the salicylate, the glycolate, the succinate, the nicotinate, the tartrate, the maleate, the malate, the lactate, and the like.

In place of the *dl*-6-dimethylamino-4,4-diphenyl-3-heptanone as the starting material for Examples 1 and 2, there may be substituted either the *d*- or the *l*-isomer.

The novel compounds of this invention can be used for the same purposes and in the same dosage forms, such as tablets, injectables, and elixirs, as 6-dimethylamino-4,4-diphenyl-3-heptanone and the salts thereof.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A compound selected from the class consisting of 6-dimethylamino-4,4-diphenyl-3-heptanone N-oxide and the acid addition salts thereof with pharmacologically acceptable acids.

2. 6-dimethylamino-4,4-diphenyl-3-heptanone N-oxide free base.

3. 6-dimethylamino-4,4-diphenyl-3-heptanone N-oxide acid addition salt of a pharmacologically acceptable acid.

4. 6-dimethylamino-4,4-diphenyl-3-heptanone N-oxide hydrochloride.

References Cited in the file of this patent

UNITED STATES PATENTS

| | | |
|---|---|---|
| 2,169,976 | Guenther et al. | Aug. 15, 1939 |
| 2,185,163 | Ulrich | Dec. 26, 1939 |
| 2,601,323 | Reid et al. | June 24, 1952 |
| 2,670,375 | Stoughton | Feb. 23, 1954 |